UNITED STATES PATENT OFFICE.

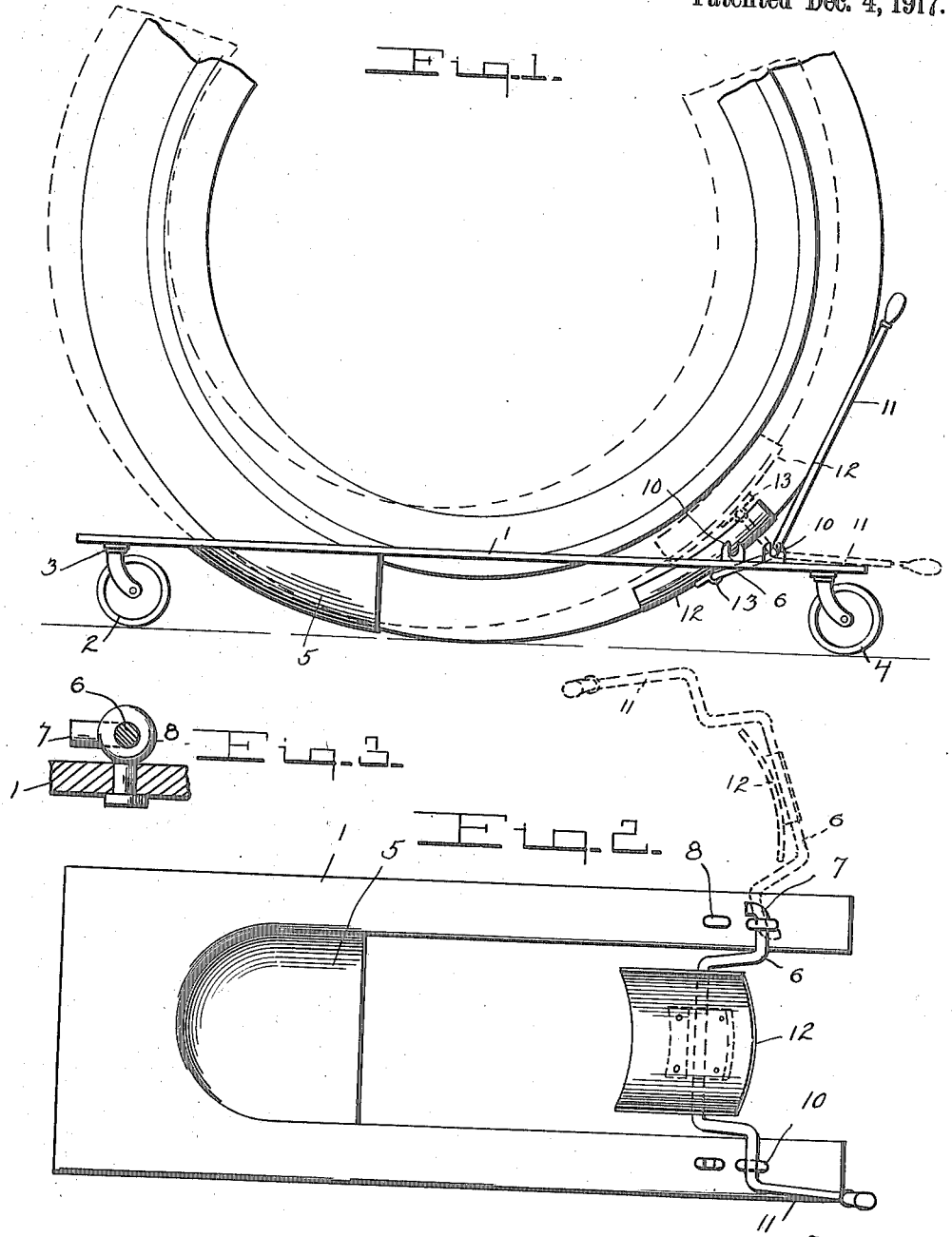

JOHN J. OLSON, OF BELVIEW, MINNESOTA.

COMBINATION AUTOMOBILE JACK AND ROLLER.

1,248,896.  Specification of Letters Patent.  Patented Dec. 4, 1917.

Application filed February 28, 1917. Serial No. 151,547.

*To all whom it may concern:*

Be it known that I, JOHN J. OLSON, a citizen of the United States, residing at Belview, in the county of Redwood and State of Minnesota, have invented certain new and useful Improvements in Combination Automobile Jacks and Rollers; and I do hereby declare the following to be a full, clear, and exact description of the invention, such as will enable others skilled in the art to which it appertains to make and use the same.

This invention relates to a combination automobile jack and roller and has for one of its objects the provision of a device of this character, whereby the wheels of an automobile may be elevated and when the wheels of the automobile all have been elevated by devices of this character, the automobile may be moved from one point to another in an elevated position.

Another object of this invention is the provision of a substantially U-shaped frame supported upon swiveled rollers which are capable of permitting the frame to be moved in any direction.

Another object of this invention is the provision of means carried by the frame adapted to engage the periphery of the wheel for elevating said wheel upon the frame so that the same will be moved from an engagement with the ground or the like.

A further object of this invention is the provision of a substantially U-shaped frame having a support connected to the web thereof adapted to engage the periphery of an automobile wheel and which coöperates with a hoisting means carried by the arm portions of the frame for elevating the wheel.

A further object of this invention is the provision of a crank shaft journaled to the arm portion of the frame and having a transversely curved plate adapted to engage the periphery of the wheel and coöperate with the support in elevating the wheel upon rotating the crank shaft.

A still further object of this invention is the provision of a combination automobile jack and roller of the above stated character, which shall be simple, durable and efficient, and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:

Figure 1 is a side elevation of a combination automobile jack and roller, constructed in accordance with my invention, Fig. 2 is a top plan view of the same, Fig. 3 is a detail sectional view illustrating the means for pivotally connecting the crank shaft to one of the arm portions of the frame.

Referring in detail to the drawing, the numeral 1 indicates a substantially U-shaped frame having a roller 2 swiveled as at 3 to the under face of the web portion of said frame. Rollers 4 are swiveled to the under faces of the arm portions of the frame as shown in Fig. 1, whereby the frame is rotatably supported and which is also capable of rolling or moving in any direction, owing to the swivel connection of the rollers to the frame.

A support 5 is secured to the web portion of the frame 1 and to portions of the arms thereof, as shown in Fig. 2. The support 5 is longitudinally and transversely curved to conform to the contour of an automobile tire mounted upon the wheel.

A crank shaft 6 has one end bent to form a hook 7, which is adapted to be inserted with any one of the swiveled eyebolts 8, while its opposite end is adapted to pass between either of the pair of relatively spaced lugs 10 upon the other arm portion of the frame. The last named end of the crank shaft has formed thereon an operating lever 11.

A transversely curved shoe 12 is hingedly secured to the offset portion of the crank shaft 6, as at 13 and is adapted to engage the periphery of the tire upon the wheel after the wheel has been passed between the arms of the frame and into engagement with the support 5 and upon swinging the operating lever 11 into a position illustrated by dotted lines, the shoe 12 will elevate the wheel from engagement with the ground as illustrated by dotted lines in Fig. 1.

The plurality of lugs 10 and the plurality of eyebolts 8 provide means whereby the crank shaft may be adjusted upon the arm portions of the frame so as to accommodate wheels of several sizes.

From the foregoing description taken in connection with the accompanying drawing, it is to be noted that after the wheels of an automobile have been elevated by devices of the above referred to character, the automobile may be readily rolled to any desired point either laterally or longitudinally.

While I have shown and described the preferred embodiment of my invention, it is to be understood that minor changes in construction, combination and arrangement of parts may be made without departing from the spirit and scope of the invention as claimed.

What is claimed is:

1. A device of the character set forth comprising a substantially U-shaped frame, means for movably supporting said frame, a support secured to the arm portions and web portions of the frame and being transversely and longitudinally curved to conform to the contour of a wheel, and means carried by the free ends of the arm portions for engagement with the periphery of the wheel and coöperating with the support in elevating the wheel from engagement with the ground.

2. A device of the character set forth comprising a substantially U-shaped frame, means for movably supporting said frame, a support secured to the arm portions and the web portions of the frame for engagement with the periphery of a wheel, a crank shaft pivotally and rotatably connected to the arm portions of the frame, and means carried by the crank shaft for engagement with the periphery of the wheel and coöperating with the support in elevating the wheel upon movement of the crank shaft.

3. A device of the character set forth comprising a substantially U-shaped frame, means for movably supporting said frame, a support secured to the web and arm portions of the frame and adapted to engage the periphery of a wheel, eyebolts swiveled to one of the arm portions of the frame, a pair of relatively spaced lugs secured to the other arm portion of the frame, a crank shaft journaled in the eyebolt and lug, a transversely curved shoe pivoted to the crank shaft and adapted to engage the periphery of the wheel, and a lever formed upon the crank shaft for rotating the crank shaft to elevate the wheel.

In testimony whereof I affix my signature in presence of two witnesses.

JOHN J. OLSON.

Witnesses:
J. S. GUNELSON,
E. E. KOHLS.